(12) United States Patent
Kotary et al.

(10) Patent No.: US 10,223,094 B2
(45) Date of Patent: Mar. 5, 2019

(54) INITIALIZING A SYSTEM ON A CHIP

(71) Applicant: INTEL CORPORATION, Santa Clara, CA (US)

(72) Inventors: Karunakara Kotary, Portland, OR (US); Basavaraj B. Astekar, Hillsboro, OR (US); Zhenyu Zhu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1 day.

(21) Appl. No.: 15/282,863

(22) Filed: Sep. 30, 2016

(65) Prior Publication Data

US 2018/0095740 A1 Apr. 5, 2018

(51) Int. Cl.
*G06F 9/445* (2018.01)
*G06F 8/61* (2018.01)
*G06F 8/60* (2018.01)
*G06F 9/4401* (2018.01)
*G06F 8/654* (2018.01)

(52) U.S. Cl.
CPC ............... *G06F 8/61* (2013.01); *G06F 8/60* (2013.01); *G06F 9/4401* (2013.01); *G06F 9/445* (2013.01); *G06F 8/654* (2018.02)

(58) Field of Classification Search
CPC ... G06F 8/61; G06F 8/60; G06F 8/654; G06F 9/4401; G06F 9/445
USPC .................................................. 717/168–178
See application file for complete search history.

(56) References Cited

U.S. PATENT DOCUMENTS

| 2004/0030877 A1* | 2/2004 | Frid ..................... G06F 8/665 |
| | | 713/1 |
| 2005/0216577 A1 | 9/2005 | Durham et al. |
| 2007/0260790 A1* | 11/2007 | Chen ..................... G06F 8/65 |
| | | 710/110 |
| 2010/0070693 A1 | 3/2010 | Conley |
| 2013/0019305 A1* | 1/2013 | Berenbaum ......... G06F 12/1408 |
| | | 726/19 |
| 2014/0095855 A1 | 4/2014 | Huynh et al. |
| 2015/0331754 A1 | 11/2015 | Grobelny |

OTHER PUBLICATIONS

Microchip, "MEC140x/1x—Keyboard and Embedded Controller Products for Notebook PC", Jun. 2016, Microchip Technology Inc., 571 pages.*

LinuxBSDos.com, "A beginner's guide to disks and disk partitions in Linux", p. 1, Nov. 2014, retrieved from http://linuxbsdos.com/2014/11/08/a-beginners-guide-to-disks-and-disk-partitions-in-linux/ , 18 pages.*

(Continued)

*Primary Examiner* — Ted T. Vo
(74) *Attorney, Agent, or Firm* — International IP Law Group, P.L.L.C.

(57) ABSTRACT

In one example, a system on a chip can include an embedded controller and a security controller that can detect, during an initialization process, a request for embedded controller firmware stored in block storage from the embedded controller via a transmission link. The security controller can also retrieve the embedded controller firmware stored in the block storage and transmit the embedded controller firmware to the embedded controller via the transmission link.

17 Claims, 5 Drawing Sheets

(56) References Cited

OTHER PUBLICATIONS

LinuxBSDos.com, "A beginner's guide to disks and disk partitions in Linux", p. 2, Nov. 2014, retrieved from http://linuxbsdos.com/2014/11/08/a-beginners-guide-to-disks-and-disk-partitions-in-linux/2/, 19 pages.*

Scott Lowe, "Block level storage vs. file level storage: A comparison", 2011, TechRepublic, 9 pages.*

PCT International Search Report, PCT Application No. PCT/US2017/047369, dated Nov. 24, 2017, 3 pages.

* cited by examiner

300

INITIALIZING A SYSTEM ON A CHIP

TECHNICAL FIELD

This disclosure relates generally to system on a chip circuits, but not exclusively, to initializing system on a chip circuits.

BACKGROUND

System on a chip circuits can integrate various components of a computing device or any other suitable electronic system. For example, a system on a chip can include various embedded controllers, security controllers, and processing cores. In some examples, a system on a chip can also include non-volatile memory to store an operating system and firmware for components of the system on a chip. During the initialization or boot process, a system on a chip can retrieve firmware stored in non-volatile memory.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

System on a chip circuits can include any number of components and onboard microcontrollers, such as embedded controllers and baseboard management controllers, which can each have separate firmware images. Typically, each embedded controller or board management controller is not able to share block media partitions used to store system firmware images. Accordingly, separate memory devices are included in the system on a chip circuits to store firmware images for embedded controller, board management controllers, and any other microcontroller.

Techniques described herein enable an embedded controller to use a master attached flash read or write command via a transmission link such as an enhanced serial peripheral interface (eSPI), among others. For example, techniques described herein can enable a security controller to detect, during an initialization process, a request for embedded controller firmware stored in block storage from an embedded controller. The security controller can reside in a system on a chip, within a computing device, or any other system. In some examples, the request can be transmitted from an embedded controller via an enhanced serial peripheral interface (eSPI) transmission link or any other suitable transmission link. A security controller can also retrieve embedded controller firmware stored in the block storage. For example, block storage may store system firmware for hardware components of a system on a chip in addition to firmware for embedded controllers. In some embodiments, a security controller can also transmit embedded controller firmware to an embedded controller. In some examples, the security controller can transmit the embedded controller firmware to an embedded controller via the eSPI transmission link or any other transmission link used to receive the request for the firmware.

In some embodiments, the security controller described in greater detail below can also detect a request for block media based master attached flash sharing during initialization or boot mode of a device. The master attached flash sharing technique, as referred to herein, can enable a slave device to request data from a master device using an enhanced serial peripheral interface, or any other suitable interface. In some embodiments, the security controller can also utilize drivers to retrieve data from block storage for an embedded circuit in a runtime environment.

Reference in the specification to "one embodiment" or "an embodiment" of the disclosed subject matter means that a particular feature, structure, or characteristic described in connection with the embodiment is included in at least one embodiment of the disclosed subject matter. Thus, the phrase "in one embodiment" may appear in various places throughout the specification, but the phrase may not necessarily refer to the same embodiment.

Figure 1:
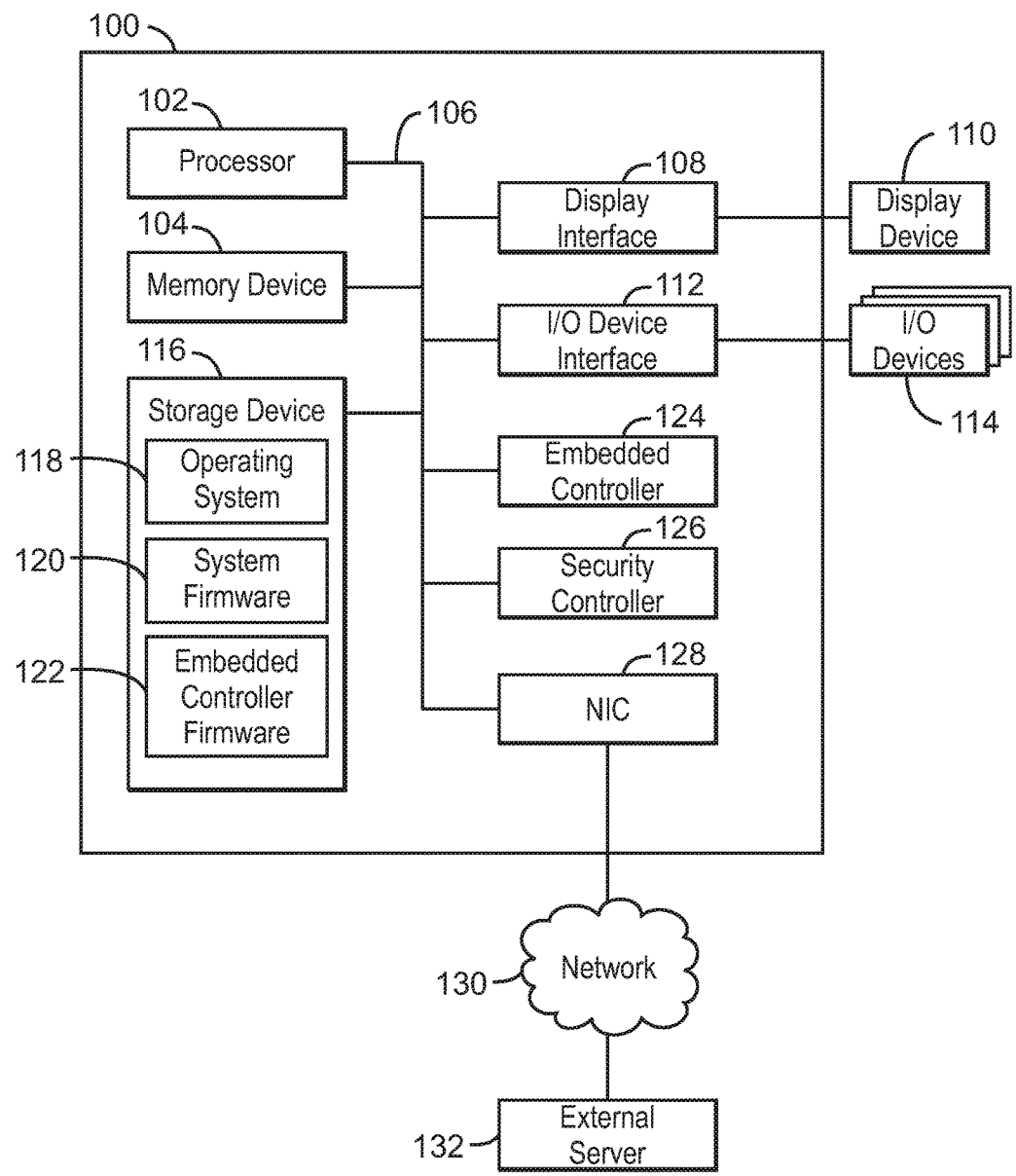
FIG. 1 illustrates a block diagram of a computing device that can load firmware for an embedded controller via a serial peripheral interface.

FIG. 1 is a block diagram of an example of a computing device that can load firmware for an embedded controller via a serial peripheral interface. The computing device 100 may be, for example, a mobile phone, laptop computer, desktop computer, or tablet computer, among others. The computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory, read only memory, flash memory, or any other suitable memory systems. The instructions that are executed by the processor 102 may be used to implement a method that can load firmware for an embedded controller via a serial peripheral interface.

The processor 102 may also be linked through the system interconnect 106 (e.g., PCI®, PCI-Express®, NuBus, etc.) to a display interface 108 adapted to connect the computing device 100 to a display device 110. The display device 110 may include a display screen that is a built-in component of the computing device 100. The display device 110 may also include a computer monitor, television, or projector, among others, that is externally connected to the computing device 100. The display device 110 can include light emitting diodes (LEDs), and micro-LEDs, among others.

The processor 102 may be connected through a system interconnect 106 to an input/output (I/O) device interface 112 adapted to connect the computing device 100 to one or more I/O devices 114. The I/O devices 114 may include, for example, a keyboard and a pointing device, wherein the pointing device may include a touchpad or a touchscreen, among others. The I/O devices 114 may be built-in components of the computing device 100, or may be devices that are externally connected to the computing device 100.

In some embodiments, the processor 102 may also be linked through the system interconnect 106 to a storage device 116 that can include a hard drive, an optical drive, a USB flash drive, an array of drives, or any combinations thereof. In some embodiments, the storage device 116 can include any suitable applications. In some embodiments, the storage device 116 can include system firmware 118, embedded controller firmware 120, and an operating system 122. In some embodiments, the operating system 122 can be any suitable software that manages hardware components and software resources for applications executed by the processor 102. The system firmware 118 can include any suitable number of firmware images or software packages that provide control, monitoring, and data manipulation for components of the computing device 100. For example, the system firmware 118 may include firmware for the storage device 116, display interface 108, and input/output device interface 112, among others. The embedded controller firmware 120 can include separate firmware images or software packages to enable operation of a baseboard management microcontroller, and the like.

In some embodiments, the processor 102 may also be linked through the system interconnect 106 to an embedded controller 124 and a security controller 126. In some examples, the system interconnect 106 can be a serial peripheral interface or enhanced serial peripheral interface, among other transmission links. The embedded controller 124 can be a baseboard management controller, or any other suitable microcontroller. The embedded controller can request the embedded controller firmware 120 via the security controller 126. For example, the security controller 126 can detect a request for embedded controller firmware 120 from the embedded controller 124 via the system interconnect 106. The security controller 126 can request the embedded controller firmware 120 from the storage device 116 and return the embedded controller firmware 120 to the embedded controller 124 via the system interconnect 106.

In some embodiments, the security controller 126 can determine that the operating system 122 has been initialized and is executing a runtime environment. The security controller 126 may use any suitable number of drivers to request data, such as the embedded controller firmware 120, from the storage device 116. Using drivers to access the storage device 116 is also referred to herein as a proxy path, which is described in greater detail below in relation to FIG. 2.

In addition, a network interface controller (also referred to herein as a NIC) 128 may be adapted to connect the computing device 100 through the system interconnect 106 to a network 130. The network 130 may be a cellular network, a radio network, a wide area network (WAN), a local area network (LAN), or the Internet, among others. The network 130 can enable data to be transmitted between the computing device 100 and an external server 132. In some embodiments, the external server 132 can provide a service for the computing device 100. For example, the computing device 100 can transmit a request for the embedded controller firmware 120 to the external server 132 and the external server 132 can return the embedded controller firmware 120 to the embedded controller 124 via the security controller 126.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, additional modules, additional network interfaces, etc.). Furthermore, any of the functionalities of the embedded controller 124 and security controller 126 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the embedded controller 124 and security controller 126 can be implemented with logic, wherein the logic, as referred to herein, can include any suitable hardware (e.g., a processor, among others), software (e.g., an application, among others), firmware, or any suitable combination of hardware, software, and firmware.

Figure 2:
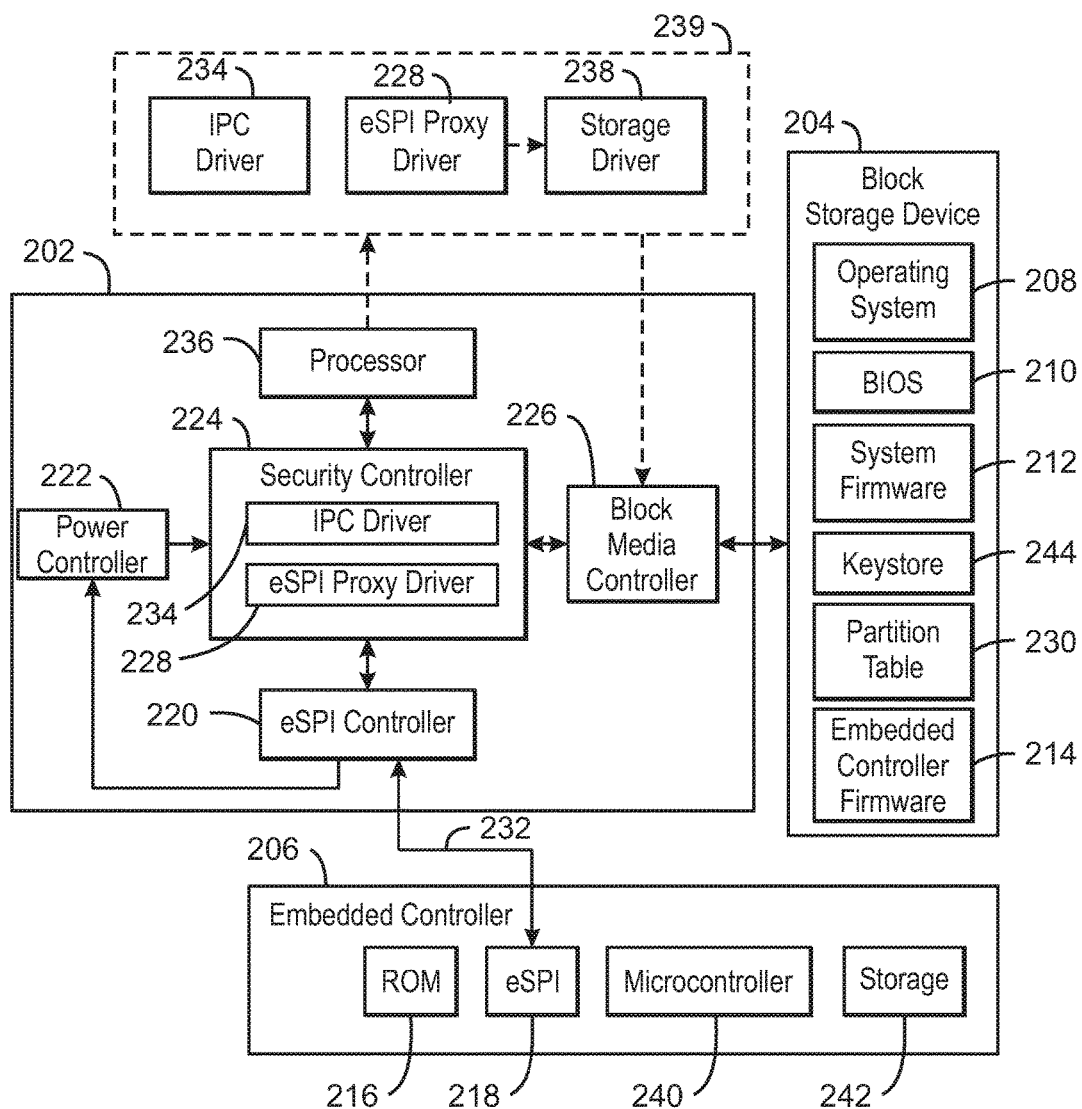
FIG. 2 illustrates a block diagram of a system on a chip that can load firmware for an embedded controller via a serial peripheral interface.

FIG. 2 illustrates a block diagram of a system on a chip that can load firmware for an embedded controller via a serial peripheral interface. The system 200 can include a system on a chip 202, a block storage device 204, and an embedded controller 206.

In some embodiments, the system 200 can receive power, which can begin the initiation process for the block storage device 204 and the embedded controller 206. In some embodiments, the embedded controller 206 can be a baseboard management controller, among others. The block storage device 204 can be any suitable non-volatile memory device that can store an operating system 208, a basic input/output system (BIOS) 210, system firmware 212 for hardware components of the system on a chip 202, and embedded controller firmware 214 for the embedded controller 206.

In some embodiments, the embedded controller 206 can reset and begin executing internal firmware that is stored in read only memory 208 located on the embedded controller 216. The internal firmware can enable the embedded controller 206 to transmit data to the system on a chip 202 using any suitable protocol such as an enhanced serial peripheral interface (eSPI), among others. In some embodiments, the embedded controller 206 can use an eSPI component 218 to transmit an indicator or a signal to the system on a chip 202 to provide power to eSPI controller 220 in the system on a chip 202.

In some embodiments, a system on a chip power controller 222 can be initiated and initiate a security controller 224, and block media controller 226. In some examples, the security controller 224 can be initiated based on external security controller firmware retrieved from the system firmware 212 in the block storage device 204 via internal security controller firmware stored in read only memory residing on the security controller 224.

In some embodiments, the security controller 224 can transmit a signal to the system on a chip power controller 222. The signal can indicate that the initiation process for the system on a chip 202 can proceed by loading additional system firmware 212 located in the block storage device 204 into additional hardware components.

In some embodiments, the system on a chip power controller 222 can send a signal to the embedded controller 206 via the eSPI controller 220. In some examples, the embedded controller 206 can use an eSPI proxy driver 228 stored in memory in the embedded controller 206 to trigger external firmware for the embedded controller 206 to be loaded from the block storage device 204 via a read firmware command. In some examples, the read firmware command can include a controller identifier, a base memory address, and a length command.

In some embodiments, the system on a chip eSPI controller 220 can detect a boot media type via a boot media strap and route commands to the security controller 214 via the system on a chip eSPI security controller interface 220.

In some embodiments, the security controller 224 can read a partition table 230 from the block storage device 204 and search for an embedded controller firmware identifier that indicates a location of the external embedded controller firmware 214 in the block storage device 204. In some examples, the security controller 224 can copy the external embedded controller firmware 214 to the embedded controller 206 via the eSPI controller 220. For example, the security controller 224 can copy the external embedded controller firmware 214 based on any suitable number of blocks or data chunks. In one example, the security controller 224 can use a ring buffer to store the blocks of data and transmit the blocks of data to the embedded controller 206 via the eSPI controller 220. In some embodiments, the eSPI controller 220 can use direct memory access techniques to access blocks of data of the external embedded controller firmware 214 and transmit the blocks of data to the embedded controller 206. In some examples, this process is repeated until each block of data of external embedded controller firmware 214 is transmitted to the embedded controller 206 via the eSPI controller 220. In some embodiments, the security controller 224 transmits load results to the embedded controller 206 over an eSPI transmission link 232.

In some embodiments, the security controller 224 can detect that an operating system 208 or a basic input/output system (BIOS) 210 has been initiated. The security controller 224 can call an eSPI proxy driver 228 and an inter processor communication (IPC) driver 234, which are executed by a processor core 236. The eSPI proxy driver 228 and the IPC driver 234 can retrieve data from the block storage device 204 in a runtime environment. For example, the storage device 204 may be single headed, which prevents more than one process or application from accessing data at any particular time. Accordingly, BIOS 210 or an operating system 208 may control access to the storage device 204 after the initialization process has completed. In some examples, the security controller 224 executes the eSPI proxy driver 228 and IPC driver 234 to access the storage device 204 when the BIOS 210 or the operating system 208 prevents the security controller 224 from directly accessing data. In some embodiments, the eSPI proxy driver 228 and the IPC driver 234 retrieve data from the block storage device 204 via the block media controller 226. The security controller 224 can retrieve firmware or any other suitable data for the embedded controller 206 from the block storage device 204 during a runtime environment. In some examples, the eSPI proxy driver 228 and the IPC driver 234 retrieve data from the block storage device 204 via a storage driver 238. The box 239 with the broken lines indicates that the eSPI proxy driver 228, the IPC driver 234, and the storage driver 238 can be executed by the processor 236 to retrieve data from the block storage device 204.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional memory components, embedded controllers, additional modules, additional network interfaces, etc.). For example, the embedded controller 206 can also include a microcontroller 240 and storage 242. The microcontroller 240 can execute instructions retrieved from the read only memory 216 or storage 242. Furthermore, the block storage device 204 can also include a keystore 244 that can store data used to sign and verify firmware images such as embedded controller firmware. Additionally, the security controller 224 can use any number of drivers, such as storage drivers, proxy drivers, and the like, to retrieve data stored in the block storage device 204 during a runtime environment. In some examples, the security controller 224 can retrieve embedded controller firmware 214 and system firmware 212 from the block storage device 204 during an initialization process without executing instructions by the processor 238. For example, the security controller 224 may use the eSPI proxy driver 230 to directly retrieve data from the block storage device 204 via the block media controller 226.

Figure 3:
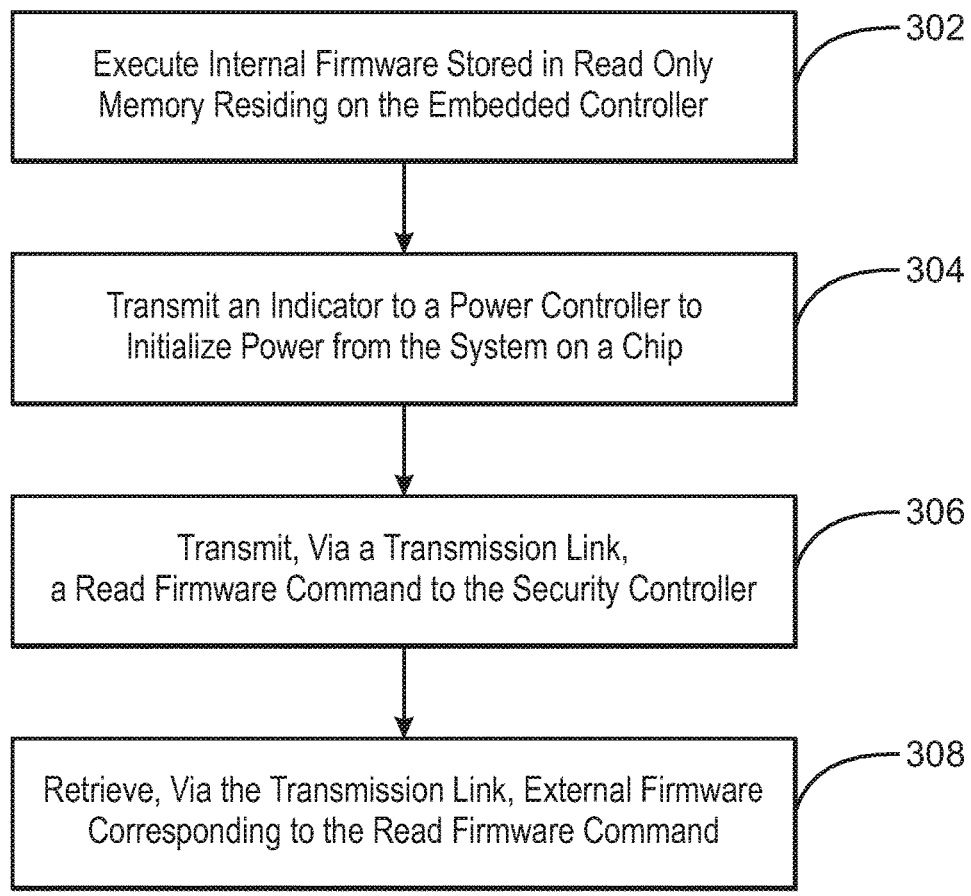
FIG. 3 is a process flow diagram of an example method for an embedded controller loading firmware via a security controller and a serial peripheral interface.

FIG. 3 is a process flow diagram of an example method for an embedded controller loading firmware via a security controller and a serial peripheral interface. The method 300 can be implemented with any suitable computing device such as computing device 100 of FIG. 1, among others.

At block 302, the embedded controller can execute internal firmware stored in read only memory residing on the embedded controller. For example, the internal firmware stored on the embedded controller can enable the embedded controller to communicate with a security controller using a serial peripheral interface or an enhanced serial peripheral interface, among others. In some embodiments, the internal firmware can include any number of software packages that enable the embedded controller to initialize and transmit data or data requests to a security controller or any other suitable microcontroller or device. For example, internal firmware can include master attached flashing model firmware.

At block 304, the embedded controller can transmit an indicator to a power controller to initialize power for the system on a chip. For example, the internal firmware can enable the embedded controller to transmit an indicator or a signal to a system on a chip to provide power to an input/output hub in the system on a chip. In some examples, the system on a chip can include a security controller, eSPI controller, and block media controller. Accordingly, the indicator can result in power being provided to the security controller, the eSPI controller, and the block media controller. In some embodiments, the security controller can retrieve embedded controller firmware for the embedded controller. The eSPI controller can enable data to be transmitted via an enhanced serial peripheral interface. The block media controller can enable data to be transmitted from a storage device such as a block storage media device, among others.

At block 306, the embedded controller can transmit, via a serial peripheral interface transmission link, a read firmware command to the security controller. The read firmware command can indicate a location or start address corresponding to a beginning memory address of the embedded controller firmware and a size of the embedded controller firmware, among others.

At block 308, the embedded controller can retrieve, via the serial peripheral interface transmission link, external firmware corresponding to the read firmware command. In some examples, the external firmware is to be retrieved from block storage via the security controller. In some embodiments, the external firmware can include embedded controller firmware. The embedded controller can retrieve the embedded controller firmware from a security controller via a serial peripheral interface, an eSPI transmission link, and the like. In some examples, the embedded controller receives data chunks of the embedded controller firmware as described in greater detail above in relation to FIG. 2.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
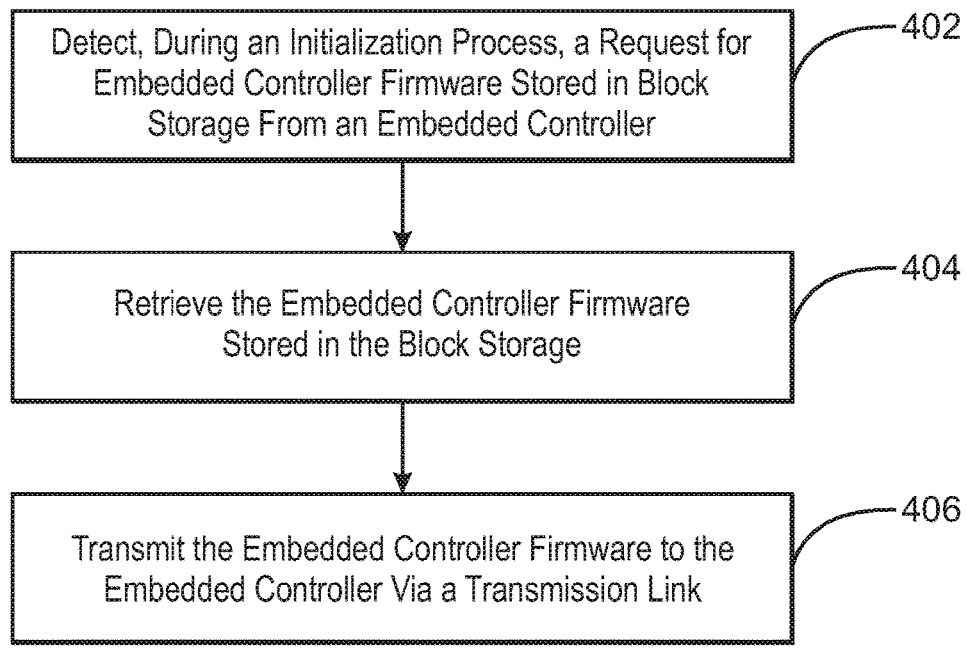
FIG. 4 is a process flow diagram of an example method for a security controller loading firmware for an embedded controller via a serial peripheral interface.

FIG. 4 is a process flow diagram of an example method for a security controller loading firmware for an embedded controller via a serial peripheral interface. The method 400 can be implemented with any suitable computing device such as computing device 100 of FIG. 1, among others.

At block 402, the security controller can detect, during an initialization process, a request for embedded controller firmware stored in block storage from the embedded controller via an enhanced serial peripheral interface (eSPI) transmission link. For example, the security controller can detect a request for block media based master attached flash sharing. Master attached flash, as referred to herein, includes a mode in which a slave device can use a flash device coupled to a master device to store firmware for the slave device. In some examples, the initialization process is a boot process for the system on a chip. In some embodiments, the request can include a start address corresponding to a beginning memory address of the embedded controller firmware and a size of the embedded controller firmware.

At block 404, the security controller can retrieve the embedded controller firmware stored in the block storage. In some embodiments, the security controller can read a partition table from the block storage and search for a firmware identifier to locate the embedded controller firmware. In some embodiments, the security controller can access block storage using a non-volatile memory express (NVME) protocol, a peripheral component interconnect (PCI) protocol, or a universal flash storage (UFS) protocol, among others.

At block 406, the security controller can transmit the embedded controller firmware to the embedded controller via the eSPI transmission link. For example, the security controller can transmit any number of data chunks comprising the embedded controller firmware to the embedded controller using any suitable protocol such as an enhanced serial peripheral interface protocol, among others.

The process flow diagram of FIG. 4 is not intended to indicate that the operations of the method 400 are to be executed in any particular order, or that all of the operations of the method 400 are to be included in every case. Additionally, the method 400 can include any suitable number of additional operations. For example, the security controller can detect that a basic input/output system (BIOS) or an operating system is initiated and retrieve the embedded controller firmware stored in the block storage via a driver stored in the security controller. In some examples, the driver can access the block storage via at least one processor core during runtime. Therefore, the security controller has a proxy path to use in response to detecting a request from an embedded controller to retrieve data from block storage during a runtime environment.

Figure 5:
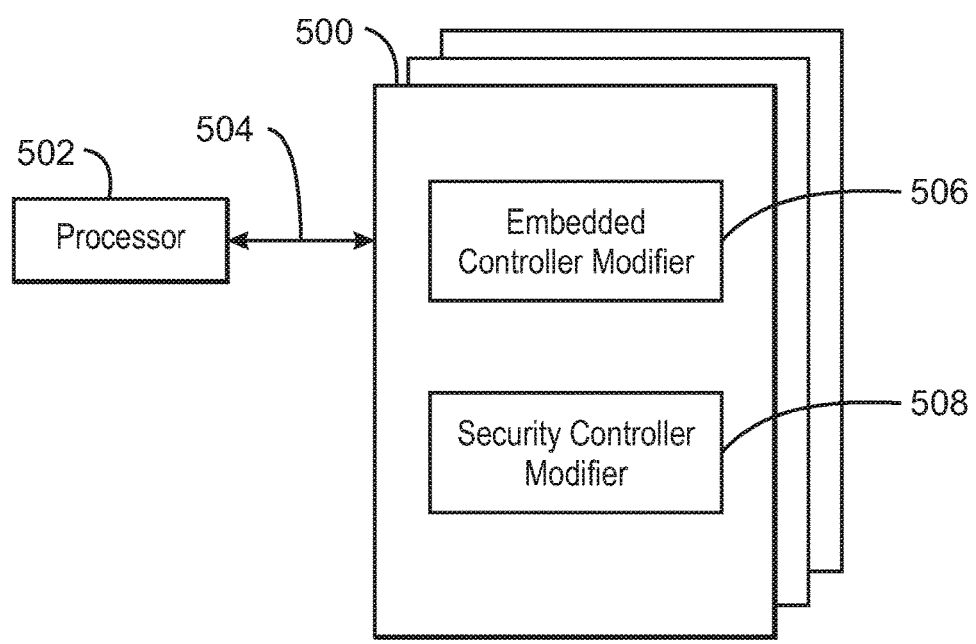
FIG. 5 illustrates a block diagram of a non-transitory computer readable media for loading firmware for an embedded controller via a serial peripheral interface.

FIG. 5 illustrates a block diagram of a non-transitory computer readable media for loading firmware for an embedded controller via a serial peripheral interface. The tangible, non-transitory, computer-readable medium 500 may be accessed by a processor 502 over a computer interconnect 504. Furthermore, the tangible, non-transitory, computer-readable medium 500 may include code to direct the processor 502 to perform the operations of the current method.

The various software components discussed herein may be stored on the tangible, non-transitory, computer-readable medium 500, as indicated in FIG. 5. For example, an embedded controller modifier 506 that can execute internal firmware stored in read only memory residing on the embedded controller. In some embodiments, the embedded controller modifier 506 can also transmit an indicator to a power controller to initialize power for a system on a chip, the system on a chip comprising a security controller, an enhanced serial peripheral interface (eSPI)controller, and a block media controller. The embedded controller modifier 506 can also transmit, via an enhanced serial peripheral interface transmission link, a read firmware command to the security controller and retrieve, via the enhanced serial peripheral interface transmission link, external firmware corresponding to the read firmware command, the external firmware to be retrieved from the block storage via the security controller.

In some embodiments, the non-transitory computer-readable medium 500 can also include a security controller modifier 508. In some embodiments, the security controller modifier 508 can detect, during an initialization process, a request for embedded controller firmware stored in block storage from an embedded controller via a transmission link such as an enhanced serial peripheral interface (eSPI). The security controller modifier 508 can also retrieve the embedded controller firmware stored in the block storage and transmit the embedded controller firmware to the embedded controller via the transmission link.

It is to be understood that any suitable number of the software components shown in FIG. 5 may be included within the tangible, non-transitory computer-readable medium 500. Furthermore, any number of additional software components not shown in FIG. 5 may be included within the tangible, non-transitory, computer-readable medium 500, depending on the specific application.

Example 1

In some examples, a system for loading firmware comprises a security controller to detect, during an initialization process, a request for embedded controller firmware stored in block storage from an embedded controller via a transmission link. The security controller can also retrieve the embedded controller firmware stored in the block storage and transmit the embedded controller firmware to the embedded controller via the transmission link.

Alternatively, or in addition, the security controller can detect that a basic input/output system (BIOS) or an operating system is initiated and retrieve the embedded controller firmware stored in the block storage via a driver stored in the security controller, the driver to access the block storage via at least one processor core during runtime. Alternatively, or in addition, the security controller can read a partition table from the block storage and search for a firmware identifier to locate the embedded controller firmware. Alternatively, or in addition, the initialization process can be a boot process for the system on a chip. Alternatively, or in addition, the security controller can access the block storage using a non-volatile memory express (NVME) protocol. Alternatively, or in addition, the security controller can access the block storage using a universal flash storage (UFS) protocol. Alternatively, or in addition, the request can include a start address corresponding to a beginning memory address of the embedded controller firmware and a size of the embedded controller firmware.

Example 2

In some examples, a method for loading firmware includes detecting a request for embedded controller firmware stored in block storage from an embedded controller via a transmission link. The method can also include retrieving the embedded controller firmware stored in the block storage and transmitting the embedded controller firmware to the embedded controller via the transmission link.

Alternatively, or in addition, the method can include detecting that a basic input/output system (BIOS) or an operating system is initiated and retrieving the embedded controller firmware stored in the block storage via a driver stored in the security controller, the driver to access the block storage via at least one processor core during runtime. Alternatively, or in addition, the method can include reading a partition table from the block storage and searching for a firmware identifier to locate the embedded controller firmware. Alternatively, or in addition, the initialization process can be a boot process for the system on a chip. Alternatively, or in addition, the method can include accessing the block storage using a non-volatile memory express (NVME) protocol. Alternatively, or in addition, the method can include accessing the block storage using a universal flash storage (UFS) protocol. Alternatively, or in addition, the request can include a start address corresponding to a beginning memory address of the embedded controller firmware and a size of the embedded controller firmware.

Example 3

In some examples, a system for loading firmware can include an embedded controller that can execute internal firmware stored in read only memory residing on the embedded controller. The embedded controller can also transmit an indicator to a power controller to initialize power for a system on a chip, the system on a chip comprising a security controller, an enhanced serial peripheral interface (eSPI) controller, and a block media controller. The embedded controller can also transmit, via an enhanced serial peripheral interface transmission link, a read firmware command to the security controller. Furthermore, the embedded controller can retrieve, via the enhanced serial peripheral interface transmission link, external firmware corresponding to the read firmware command, the external firmware to be retrieved from the block storage via the security controller.

Alternatively, or in addition, the read firmware command can include a controller identifier, a base address, and a length of command. Alternatively, or in addition, the internal firmware can include master attached flashing model firmware. Alternatively, or in addition, the read firmware command can include a request for embedded controller firmware. Alternatively, or in addition, the embedded controller can transmit the read firmware command to the security controller via a security controller interface. Alternatively, or in addition, the embedded controller can transmit the read firmware command during a runtime environment, the runtime environment comprising an initiated operating system or an initiated basic input/output system (BIOS).

Although an example embodiment of the disclosed subject matter is described with reference to block and flow diagrams in FIGS. 1-5, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A system on a chip for loading firmware comprising:
a security controller to:
detect, during an initialization process, a request for embedded controller firmware stored in block storage from an embedded controller via a transmission link;
read a partition table from the block storage and search for a firmware identifier to locate the embedded controller firmware, wherein the block storage comprises an operating system and the embedded controller firmware;
retrieve the embedded controller firmware stored in the block storage based on the firmware identifier; and
transmit the embedded controller firmware to the embedded controller via the transmission link, wherein the transmission link is to use a ring buffer to store data blocks corresponding to the operating system and the embedded controller firmware.

2. The system of claim 1, wherein the security controller is to detect that a basic input/output system (BIOS) or an operating system is initiated and retrieve the embedded controller firmware stored in the block storage via a driver stored in the security controller, the driver to access the block storage via at least one processor core during runtime.

3. The system of claim 1, wherein the initialization process is a boot process for the system on a chip.

4. The system of claim 1, wherein the security controller is to access the block storage using a non-volatile memory express (NVME) protocol.

5. The system of claim 1, wherein the security controller is to access the block storage using a universal flash storage (UFS) protocol.

6. The system of claim 1, wherein the request comprises a start address corresponding to a beginning memory address of the embedded controller firmware and a size of the embedded controller firmware.

7. The system of claim 1, wherein the transmission link is an eSPI transmission link.

8. A method for loading firmware comprising:
detecting a request for embedded controller firmware stored in block storage from an embedded controller via a transmission link;
reading a partition table from the block storage and searching for a firmware identifier to locate the embedded controller firmware, wherein the block storage comprises an operating system and the embedded controller firmware;
retrieving the embedded controller firmware stored in the block storage based on the firmware identifier, wherein a security controller is to detect that the operating system is initiated and retrieve the embedded controller firmware stored in the block storage via a driver stored in the security controller, the driver to access the block storage via at least one processor core during runtime; and
transmitting the embedded controller firmware to the embedded controller via the transmission link, wherein the transmission link is to use a ring buffer to store data blocks corresponding to the operating system and the embedded controller firmware.

9. The method of claim 8, comprising accessing the block storage using a peripheral component interconnect (PCI) protocol.

10. The method of claim 8, comprising accessing the block storage using a non-volatile memory express (NVME) protocol.

11. The method of claim 8, comprising accessing the block storage using a universal flash storage (UFS) protocol.

12. The method of claim 8, wherein the request comprises a start address corresponding to a beginning memory address of the embedded controller firmware and a size of the embedded controller firmware.

13. A system for loading firmware comprising:
an embedded controller to:
execute internal firmware stored in read only memory residing on the embedded controller;
transmit an indicator to a power controller to initialize power for a system on a chip, the system on a chip comprising a security controller, an enhanced serial peripheral interface (eSPI) controller, and a block media controller;
transmit, via an enhanced serial peripheral interface transmission link, a read firmware command to the security controller, wherein the embedded controller is to transmit the read firmware command during a runtime environment, the runtime environment comprising an initiated operating system; and
retrieve, via the enhanced serial peripheral interface transmission link, external firmware corresponding to the read firmware command, the external firmware to be retrieved from the block storage via the security controller, wherein the block storage comprises data blocks corresponding to the initiated operating system and the external firmware, wherein the serial peripheral interface transmission link is to use a ring buffer to store the data blocks corresponding to the initiated operating system and the external firmware.

14. The system of claim 13, wherein the read firmware command comprises a controller identifier, a base address, and a length of command.

15. The system of claim 13, wherein the internal firmware comprises master attached flashing model firmware.

16. The system of claim 13, wherein the read firmware command comprises a request for embedded controller firmware.

17. The system of claim 13, wherein the embedded controller is to transmit the read firmware command to the security controller via a security controller interface.

* * * * *